United States Patent
Ristivojevic et al.

(10) Patent No.: US 9,602,778 B2
(45) Date of Patent: Mar. 21, 2017

(54) SECURITY VIDEO SYSTEM USING CUSTOMER REGIONS FOR MONITORING POINT OF SALE AREAS

(71) Applicant: Sensormatic Electronics, LLC, Boca Raton, FL (US)

(72) Inventors: Mirko Ristivojevic, Cambridge, MA (US); Ian Christopher Westmacott, Wakefield, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 696 days.

(21) Appl. No.: 13/712,591

(22) Filed: Dec. 12, 2012

(65) Prior Publication Data

US 2014/0160293 A1    Jun. 12, 2014

(51) Int. Cl.
*H04N 7/18* (2006.01)
*G08B 13/196* (2006.01)
(Continued)

(52) U.S. Cl.
CPC ............. *H04N 7/18* (2013.01); *G06Q 20/20* (2013.01); *G07G 3/003* (2013.01); *G08B 13/19613* (2013.01); *G08B 13/19682* (2013.01)

(58) Field of Classification Search
CPC ....... G07F 19/207; G07F 19/20; G07G 3/003; G07G 3/00; H04H 7/181
(Continued)

(56) References Cited

U.S. PATENT DOCUMENTS 7,925,536 B2    4/2011  Lipton et al.
2008/0218591 A1*  9/2008  Heier ................. G06Q 20/20
                                                        348/150
(Continued)

FOREIGN PATENT DOCUMENTS

WO    2008008505 A2    1/2008
WO    WO2008008505   *  1/2008  ............. H04N 7/18

OTHER PUBLICATIONS

AD American Dynamics, 'IntelliVid Video Investigator Software User Guide,' Version 2.1.5, Tyco, Part No. 8200-2636-01 A0, 2009, 396 pages.
(Continued)

*Primary Examiner* — William C Vaughn, Jr.
*Assistant Examiner* — Daniel Tekle
(74) *Attorney, Agent, or Firm* — HoustonHogle LLP

(57) ABSTRACT

A system and method for determining proximity of individuals to specific regions of interest such as Point of Sale ("POS") terminals within a POS monitored area of a scene of video data captured from security cameras as part of a networked security system, when the security cameras are located outside the POS monitored area, mounted on a ceiling or other high location and pointed at the POS monitored area. With the help of customer regions drawn in an abstract layer whose areas coincide with expected locations of individuals near POS terminals in the video data, and video analytics elements such as bounding boxes generated around individuals in the video data, the system can perform live and forensic analysis of the video data to infer information such as the proximity of individuals to POS terminals and the relative height of an individual compared to their expected height within the scene of video data.

24 Claims, 10 Drawing Sheets

(51) Int. Cl.
*G07G 3/00* (2006.01)
*G06Q 20/20* (2012.01)

(58) Field of Classification Search
USPC .......................................... 348/151
See application file for complete search history.

(56) References Cited

U.S. PATENT DOCUMENTS

| | | | | |
|---|---|---|---|---|
| 2011/0080336 A1* | 4/2011 | Leyvand | ............... | G06T 7/0046 345/156 |
| 2012/0044141 A1* | 2/2012 | Ueshima | ................. | A63F 13/06 345/158 |
| 2013/0004090 A1* | 1/2013 | Kundu | .................. | G07F 19/207 382/232 |

OTHER PUBLICATIONS

International Search Report and Written Opinion of the International Searching Authority mailed Mar. 20, 2014 from counterpart International Application No. PCT/US2013/073838, filed Dec. 9, 2013.

International Preliminary Report on Patentability, mailed Jun. 5, 2015, from counterpart International Application No. PCT/US2013/073838, filed Dec. 9, 2013.

International Preliminary Report on Patentability, mailed Jun. 25, 2015, from counterpart International Application No. PCT/US2013/073838, filed Dec. 9, 2013.

* cited by examiner

SECURITY VIDEO SYSTEM USING CUSTOMER REGIONS FOR MONITORING POINT OF SALE AREAS

BACKGROUND OF THE INVENTION

Video security systems have been traditionally used to help protect people, property, and reduce crime for homeowners and businesses alike and have become an increasingly cost-effective tool to reduce risk. Modern systems with video analytics capabilities provide the ability to detect and track individuals and objects within monitored scenes. These systems can provide both live monitoring of individuals, and forensic analysis of saved security video data to spot trends and search for specific behaviors of interest. Of increasing interest is the monitoring of point of sale ("POS") areas to track customer movement near POS terminals. This can be used, for example, to detect potentially suspicious transactions.

Video security cameras capture images of three-dimensional scenes and represent the images as frames of image data that typically represent two-dimensional arrays of pixel data. Sometimes, the image data are sent as video. Data stored in association with the image data are referred to as metadata. Components in modern video security systems use the generated metadata for analysis purposes.

Some existing systems that track customer movements near POS terminals rely on video cameras positioned directly overhead of the POS terminals, often referred to as "look-down" cameras. To infer customer movement near POS terminals, these systems compare video data taken from overhead cameras to simple relational cues that are notionally superimposed upon the video data. An example of a relational cue is a horizontal line drawn upon the video data near the POS terminal. A determination of whether customers are near a POS terminal involves an analysis of customers who cross this line or come within a certain distance to the line.

SUMMARY OF THE INVENTION

Look-down video security cameras are relatively simple to operate and can show the relative positions and motions of individuals and objects in a monitored scene, enabling the viewer to see things that individuals in the scene cannot see at eye-level. This also includes customer activity near the POS terminal. Nevertheless, the "bird's eye view" provided by look-down video cameras has limitations. Look-down cameras can only capture the tops of individuals' heads and shoulders, making value-added capabilities such as facial recognition or height determination very limited or impossible. Such information is critical for loss prevention personnel and law enforcement.

Positioning a security camera outside the POS areas provides the operator with more information about the monitored scene than a look-down camera because of the wider field of view and enhanced perspective such positioning provides. Information such as facial recognition and the relative height of an individual compared to other objects in the scene can now be ascertained.

It is therefore an object of the present invention to provide a security video system with security cameras positioned outside the monitored POS areas to provide information about movement of individuals near a POS terminal and enhanced information about the individuals within a scene as compared to look-down camera based systems, while overcoming the perspective issues that positioning the security camera outside the POS area creates.

In general, according to one aspect, the invention features a security video system for monitoring individuals at a Point Of Sale ("POS") area. The system comprises at least one security camera generating image data of the POS area, wherein the security camera is positioned outside the POS area, and a security video analytics system for analyzing the image data to determine whether the individuals are within the POS area.

In embodiments, a security system workstation is used to enable an operator to specify customer regions for the image data of the POS area. Typically, the security system workstation comprises a display, one or more user input devices, and a customer region drawing tool for defining the customer regions within the image data of the POS area, drawn by an operator over the image data.

Preferably, the customer region drawing tool represents the customer regions as areas of pixels with vertical edges parallel to the y-axis of the image data, and saves the areas of pixels comprising each of the customer regions to video data metadata. Then, the security video analytics system determines whether the individuals are within the POS area by analyzing the individuals in the image data relative to customer regions. This includes the security video analytics system generating bounding boxes around individuals in the image data, saving the bounding boxes as metadata. The security video analytics system compares the bounding boxes relative to the customer regions to infer proximity of the individuals to the POS area. This can be done as a forensic analysis on stored image data and video data metadata, or live analysis on current image data.

In general, according to another aspect, the invention features a method for monitoring individuals at a Point Of Sale ("POS") area. This method comprises positioning a security camera outside the POS area, generating image data of the POS area with the security camera, and analyzing the image data to determine whether the individuals are within the POS area.

In general, according to another aspect, the invention features a method for determining the presence of individuals at a Point Of Sale ("POS") area in a video security system. This method comprises generating image data of the POS area from at least one security camera, generating bounding boxes around individuals in the image data by a security video analytics system, representing customer regions as areas of pixels, and analyzing the bounding boxes relative to the customer regions to infer whether the individuals are within the POS area.

In embodiments, analyzing the bounding boxes relative to the customer regions includes drawing a center line bisecting each bounding box and determining intersection between one or more customer regions. In one case, the bounding boxes are analyzed relative to the customer regions by determining distances between the tops and bottoms of the bounding boxes and tops and bottoms of the customer regions to conclude whether the individuals are within the POS area.

In general, according to another aspect, the invention features a security video system for monitoring individuals at a Point Of Sale ("POS") area. The system comprises at least one security camera generating image data of the POS area and a security video analytics system for analyzing the image data to determine whether the individuals are within the POS area by generating bounding boxes around individuals in the image data, and comparing the bounding boxes relative to customer regions to infer proximity of the individuals to the POS area.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

As used herein, the singular forms including the articles: "a", "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
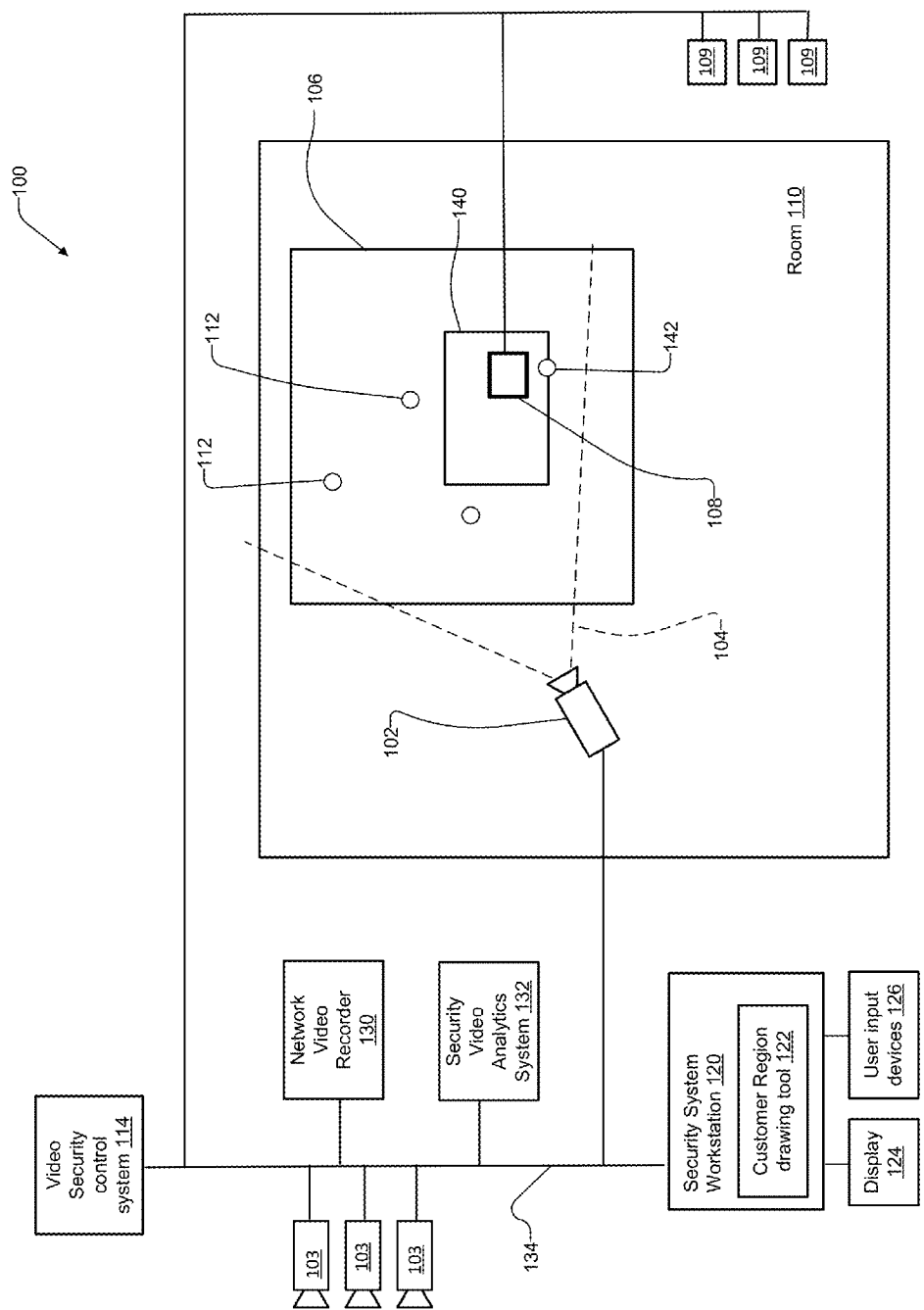
FIG. 1 is a schematic diagram showing a networked security system and a point of sale area monitored by a security camera.

FIG. 1 is a schematic diagram of a networked security system 100 and a point of sale ("POS") area 106 monitored by a security camera 102 according to principles of the present invention.

The networked security system 100 performs live monitoring and tracking of objects of interest within the video data from the security cameras 102, 103, and forensic video analysis of previously computed analytics video data metadata and video data from the security cameras 102, 103. Forensic video analysis is post-event analysis of previously-recorded video for the purpose of extracting events and data from the recorded video. Forensic analysis is used in such fields as accident investigation, gathering of evidence for legal and law enforcement purposes, loss prevention, and premises security.

Example objects within video data that are of interest to operators of the networked security system 100, such as security personnel, include individuals, entry and exit points such as doors and windows, merchandise, cash, credit cards and other devices used for credit/debit transactions, and tools involved in retail transactions, such as POS terminals.

Typical applications performed by the networked security system 100 include tracking the movement of individuals such as customers and goods relative to other objects within a scene, enlarging portions of the video to highlight areas of interest, and measuring the heights of individuals.

The networked security system 100 can be utilized to monitor and track the locations and number of individuals such as customers 112 located within the POS area 106. The POS area 106 includes a POS terminal 108, such as a cash register, that sits on top of a supporting object such as a desk 140. This allows an individual such as a clerk 142 standing behind the POS terminal 108 to perform transactions. POS transactions of interest include not only retail sales, but also returns of merchandise, and actions performed by clerks 142 or their managers at the POS terminal that do not involve customer interaction. The POS area 106 is typically a defined area within a room 110, but the POS area 106 can also be a region in a hallway or located outdoors as part of an open air market or restaurant, for example.

The networked security system 100 comprises one or more security cameras 102 that are preferably mounted outside the POS area 106 and mounted on a ceiling or other high location with the security camera's field of view 104 pointed to capture at least the objects within the POS area 106, and additional components connected via a video security network 134. These components include, but are not limited to: a video security control system 114 that controls the components within the networked security system 100;

other security cameras 103; a network video recorder 130 that records video data captured by the security cameras 102, 103; a security video analytics system 132 that identifies and analyzes objects of interest in video data generated by the security cameras 102, 103, saving relevant information about the objects to the video data metadata that is typically stored in the network video recorder 130 with the video data; and a security system workstation 120 that allows an operator to interact with and configure components in the networked security system 100.

Security cameras 103 capture video data of other POS terminals 109 connected to the networked security system 100. POS terminals 108, 109 submit messages over the video security network 134 that indicate, among other information, that a transaction has taken place at a particular POS terminal at a specific time. The network video recorder 130 saves the transaction data submitted by each POS terminal 108, 109 to the video data metadata.

The security system workstation 120 has a display 124 and user input devices 126 that allow an operator to monitor status and configure operational parameters for components in the networked security system 100. The security system workstation 120 has a customer region drawing tool 122 which an operator invokes to define customer regions.

Operators of the networked security system 100 typically configure the system to monitor and record all transactions and customer movements (or lack thereof) near the POS terminal 108 and within the entire POS area 106. Operators can then utilize video analytics functions from the security video analytics system 132 and applications in addition to the customer region drawing tool 122 on the security system workstation 120 to highlight suspicious activity or monitor specific transactions of interest, for example.

Figure 2:
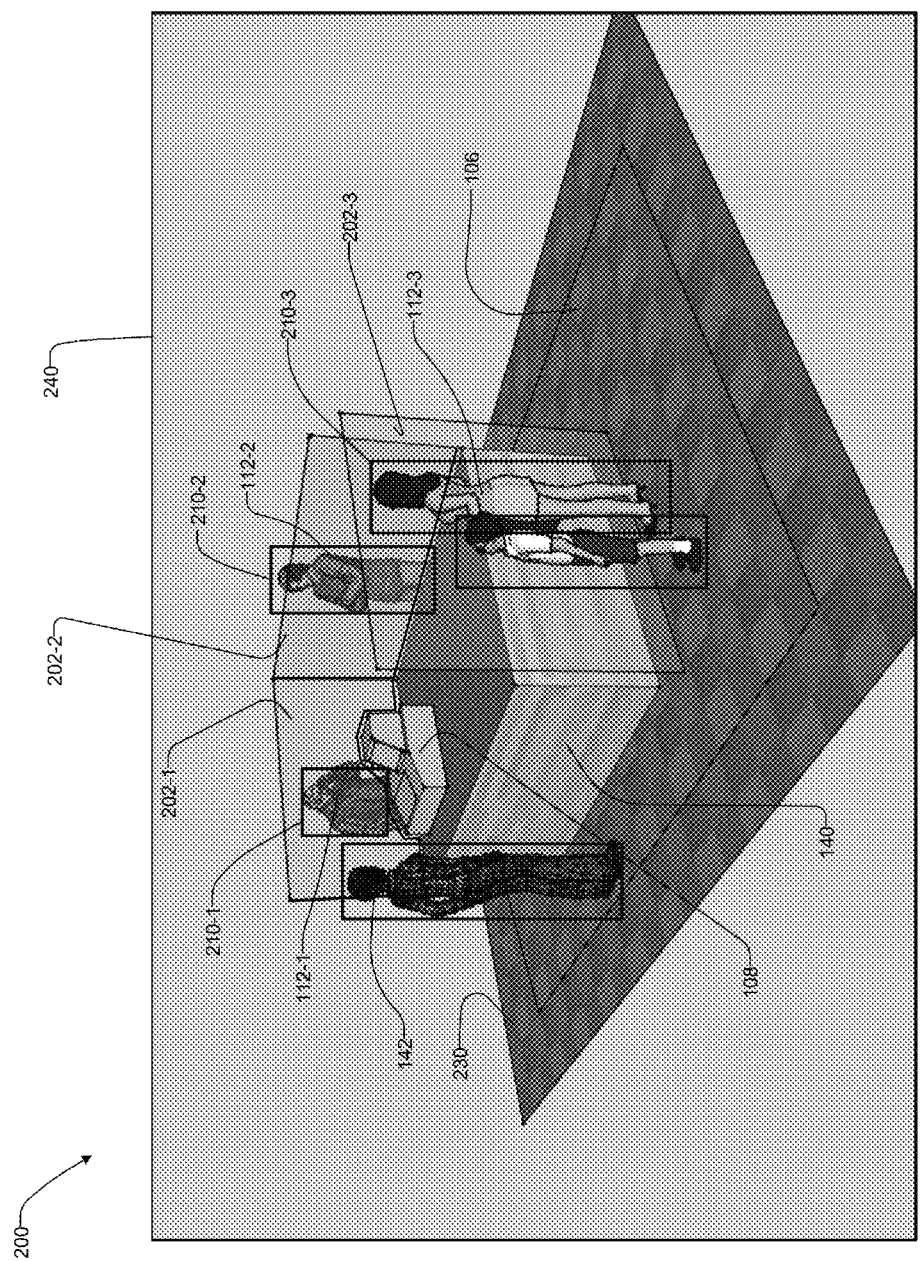
FIG. 2 is an exemplary multi-layered image 200 of a point of sale monitored area including bounding boxes generated by and customer regions monitored by a security video analytics system according to the present invention.

FIG. 2 is an exemplary multi-layered image 200 of the point of sale area 106. The image is multi-layered in that it includes a frame of the image data 240 of the POS area 106 captured by the security camera 102, with abstract layers of graphical elements superimposed upon the image data 240. These abstract layers contain information generated by the security video analytics system 132 and information created by an operator using the customer region drawing tool 122. With the aid of these abstract layers, the security video analytics system 132 can infer relationships between objects and individuals in the original image data 240.

The overlaid information includes rectangular-shaped bounding boxes 210 drawn around each individual, such as customers 112 and clerks 142, by the security video analytics system 132. The security video analytics system 132 uses the bounding boxes 210 for monitoring and tracking the movements of individuals through the frames of image data 240.

Other overlaid information includes customer regions 202 drawn by operators of the security system workstation 120 using the customer region drawing tool 122. In the illustrated example, the customer regions 202 are trapezoidal-shaped to connote areas within the video data that appear orthogonal to the plane of floor 230 and parallel to the y-axis of the video data 240.

The customer region drawing tool 122 first provides the operator with an image of the POS area 106 as captured by the security camera 102 in its field of view 104. The customer region drawing tool 122 then allows the operator to draw customer regions 202 in an abstract layer superimposed upon that image. The locations of pixels in the abstract layer have a one-to-one correspondence with the locations of pixels in the original image data 240. Using this layer, the operator can create customer regions 202 that correspond to areas within the original video data 240 where the operator anticipates customers will be standing when they are engaging in transactions near the POS terminal 108. The customer region drawing tool 122 sends the saved customer region 202 information to the security video analytics system 132 for further analysis.

The security video analytics system 132 uses the customer regions 202 in combination with the generated bounding boxes 210 to infer customer movement and presence near POS terminals 108, 109 within the original video data 240. When the security video analytics system 132 determines that an individual such as a customer 112 is located within the proximity of the POS terminal 108, the security video analytics system 132 saves this information to video data metadata, and generates an alert message for this event that components such as the security system workstation 120 can receive and further process.

The security video analytics system 132 can also compare the POS terminal customer proximity information with the transaction data submitted by POS terminals 108, 109. By analyzing this data, the security video analytics system 132 can infer and identify specific events, such as suspicious transactions. An example of a suspicious transaction is when a transaction occurs at a particular POS terminal 108 and there are no customers 112 present. The security video analytics system 132 saves this information to video data metadata, and generates an alert message for this event that components such as the security system workstation 120 can receive and further process.

When drawing the customer regions 202, the operator accounts for surfaces within the video data 240 that cause portions of individuals such as customers 112 within the video data 240 to not be visible from certain viewpoints. For example, desk 140 and POS terminal 108 partially occlude the anticipated location of an individual of average height standing near the left side of the POS terminal 108, such as customer 112-1. As a result, the operator has drawn the bottom of customer region 202-1 to coincide with the top edge of desk 140, further tracing the bottom of customer region 202-1 around the outline of POS terminal 108 to exclude from customer region 202-1 those portions in the original video data 240 near the left side of the POS terminal 108 where the location of customers 112 cannot be determined.

The security video analytics system 132 can receive information about multiple POS terminals 109 connected to the networked security system 100. This information includes customer region 202 information associated with a particular POS terminal 108. The operator creates the association between customer regions 202 and their associated POS terminal 108 when using the customer region drawing tool 122 to configure customer regions 202.

Customer regions 202 also provide the security video analytics system 132 with information about the expected average height of an individual at specific locations in the POS area 106 of the image data 240. While an operator could define customer regions 202 anywhere within the abstract layer provided by the customer region drawing tool 122, typically, operators draw customer regions 202 to coincide with the anticipated location of individuals standing near the POS terminal 108 in the video data 240. In this way, the height of the customer region 202 approximates the average height of an individual when that individual is standing near the POS terminal 108.

Using this reference information, the security video analytics system 132 infers the range of an individual located anywhere within the POS area 106, and in combination with bounding box 210 information, determines if an individual is located near a POS terminal 108.

As illustrated in FIG. 2, the operator draws the bottom edge of a customer region 202 to coincide with the anticipated location of an individual's feet or lowest visible point, and draws the top of a customer region 202 to coincide with the top of an individual's head, when that individual is standing near the POS terminal 108. The operator can define multiple customer regions 202, and they can overlap.

In the exemplary multi-layered image 200, the clerk 142 is positioned in front of the POS terminal 108. Customer 112-1 is positioned to the left of the POS terminal 108 from the viewpoint of the clerk 142. Customer 112-1 is partially occluded in the image data 240 by desk 140 and POS terminal 108. Customer 112-2 is positioned behind the POS terminal 106, directly opposite the clerk. Customer 112-2 is partially occluded in the image data 240 by desk 140. Customer 112-3 is positioned to the right of the POS terminal 108 from the viewpoint of the clerk 142. Customer 112-3 is fully visible in the image data 240.

The security video analytics system 132 tracks each individual by drawing bounding box 210-1 around customer 112-1, bounding box 210-2 around customer 112-2, bounding box 210-3 around customer 112-3 and analyzes their movements relative to other objects in the video data 240 and customer regions 202. Operators define customer regions 202 associated with areas near the POS terminal 108 that they wish to monitor.

The multi-layered image 200 illustrates customer region 202-1 drawn to the left of the POS terminal 106 with respect to the clerk 142, customer region 202-2 drawn opposite the clerk, and customer region 202-3 drawn to the right of the POS terminal 108 with respect to the clerk 142. For illustration purposes, each of the customer regions 202-1, 202-2, and 202-3 corresponds to customers 112-1, 112-2, and 112-3, respectively.

To overcome perspective issues within the video data 240 that result from positioning the security camera 102 on a ceiling or other high location outside the POS area 106 and pointing the security camera 102 at the POS area 106, the customer regions 202 comprise, in one example, a collection of trapezoidal-shaped areas with vertical edges parallel to the y-axis of the image data 240. Customer regions 202 can overlap, as each is independently defined. A customer 112 is considered to be within a customer region 202 by the security video analytics system 132 if their feet (or the lowest visible area of their body) is close to the bottom edge of an customer region 202 and their head (or the highest visible area of their body) is close to the top edge of that same customer region 202. Each trapezoidal-shaped area represents a two-dimensional plane in the three-dimensional space of the scene captured in the image data 240.

Trapezoidal-shaped areas are used to represent areas in the scene of the video data 240 that lay in planes that are not orthogonal to the security camera's optical axis or parallel to its image plane, thereby overcoming perspective issues for objects within the video data 240 due to the positioning of the security camera 102. Customers 112 standing in such planes will appear smaller if they are further away from the security camera 102, which the trapezoidal-shaped customer regions 202 take into account.

Figure 3:
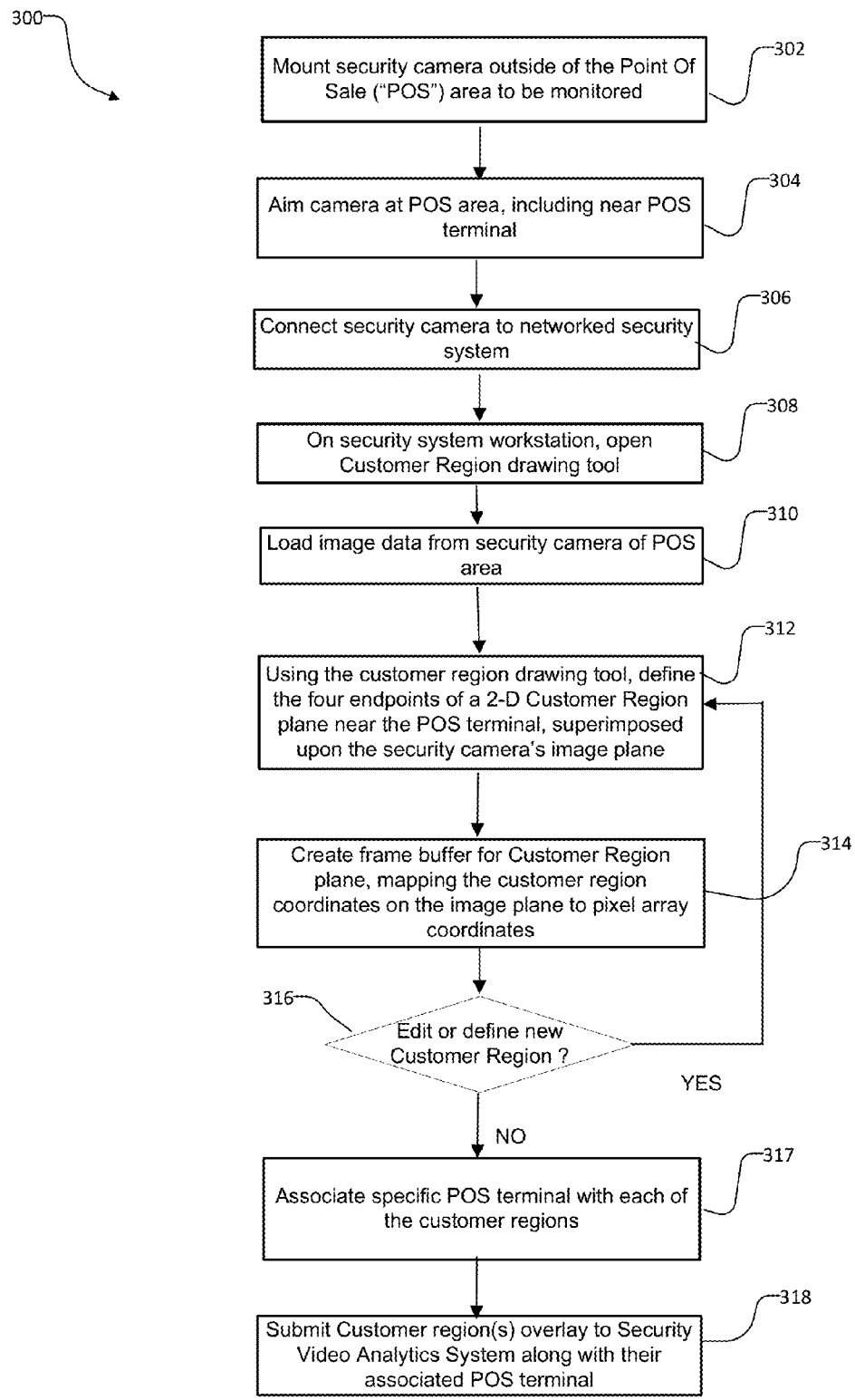
FIG. 3 is a flow chart illustrating a method for configuring the networked security system for tracking customers within customer regions of a point of sale monitored area.

FIG. 3 illustrates method 300 for how the networked security system 100 is configured to track individuals 112 within customer regions 202 of a point of sale area 106.

An operator mounts a security camera 102 outside the POS area 106 according to step 302, and then points the security camera 102 at the POS area 106, which includes areas near the POS terminal 108 according to step 304. The operator then connects the security camera 102 to the networked security system 100 according to step 306.

The operator opens the customer region drawing tool 122 on the security system workstation 120 according to step 308, and loads the image data 240 from the security camera 102 for the POS area 106 according to step 310. Using the customer region drawing tool 122, the operator defines the four endpoints of a two-dimensional customer region 202 plane near the POS terminal 108, in an abstract layer superimposed upon the image data 240 in step 312.

According to step 314, the customer region drawing tool 122 then creates a frame buffer for each customer region 202, mapping the customer region 202 coordinates associated with the image data 240 to an in-memory representation of the customer region 202, in pixel array coordinates. The operator can then edit an existing customer region 202 or define a new customer region 202 according to step 316.

According to step 317, the customer region drawing tool 122 associates a specific POS terminal with each customer region 202 and submits the information corresponding to the customer region 202 overlay and the associated POS terminal 108 for each customer region 202 to the security video analytics system 132 for further processing according to step 318.

Figure 4A:
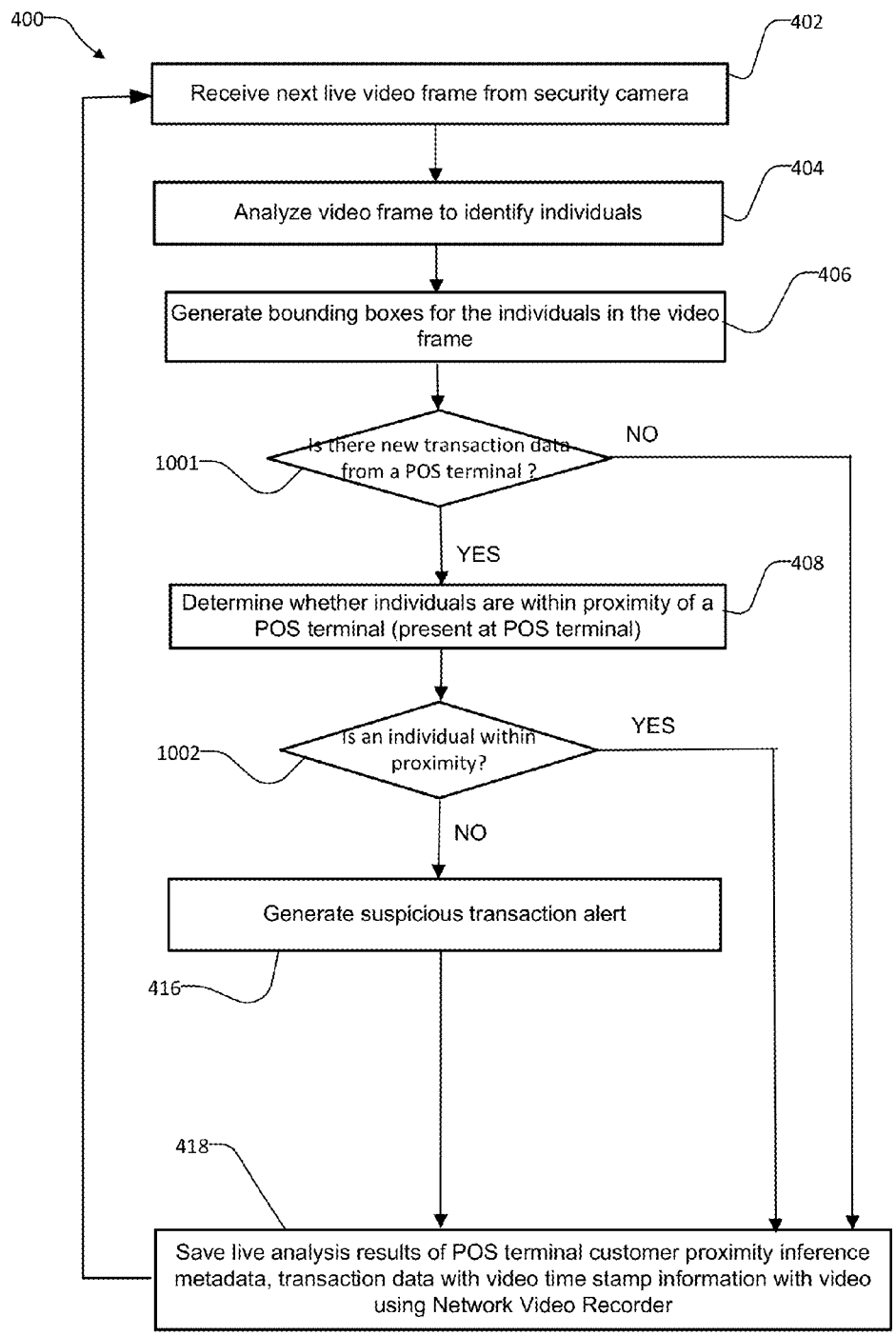
FIG. 4A is a flow chart illustrating the live processing of video data to enable the tracking of customers relative to the customer regions within the scene captured in the video data.
Figure 4B:
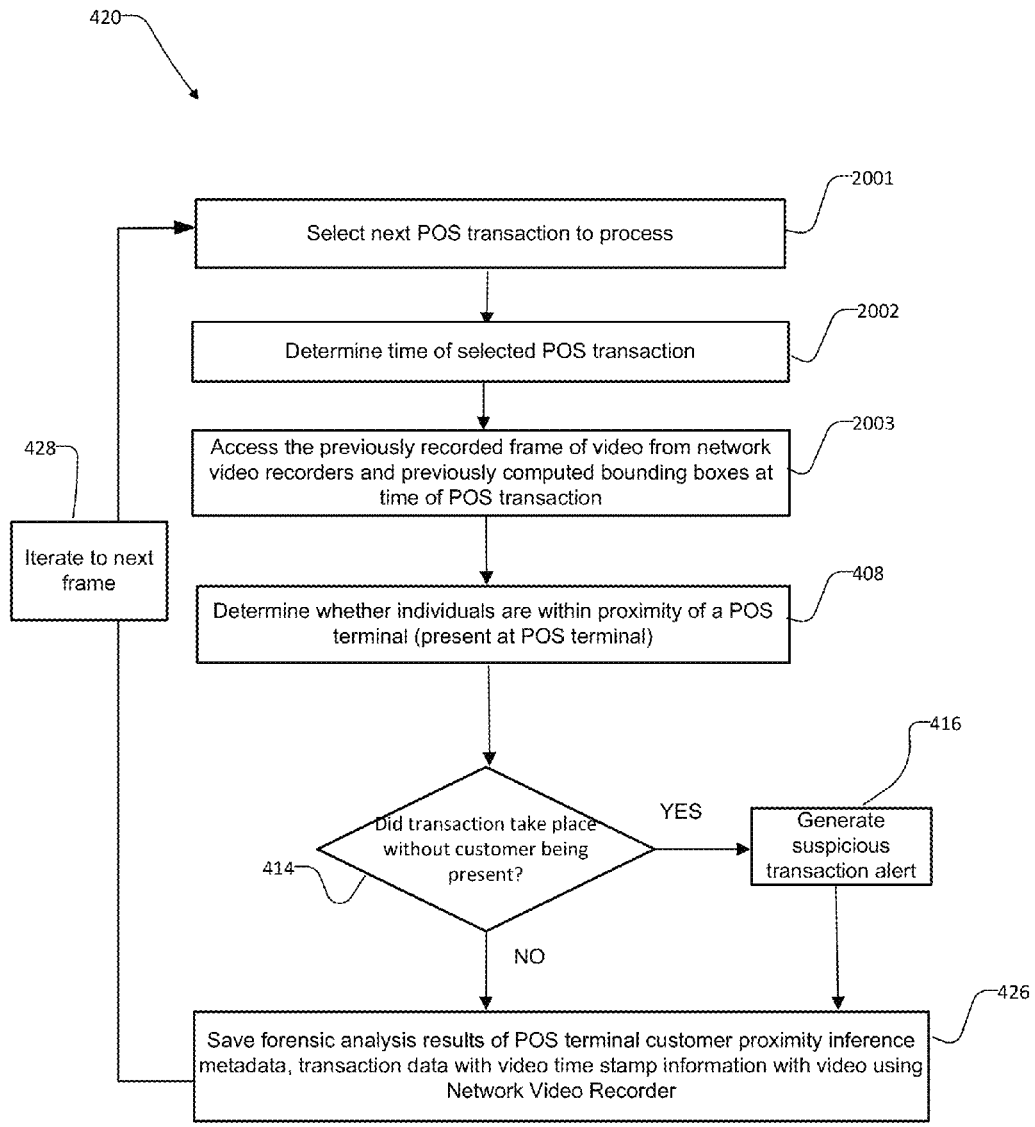
FIG. 4B is a flow chart illustrating the forensic analysis of video data to enable the tracking of customers relative to the customer regions within the scene captured in the video data.

FIG. 4A and FIG. 4B show how the system performs live processing (FIG. 4A) and forensic analysis (FIG. 4B) of video data to enable the tracking of customers 112 relative to customer regions 202 and bounding boxes 210 superimposed upon the scene captured in the video data 240 according to principles of the present invention.

FIG. 4A illustrates method 400 for live processing of video data to enable tracking of customers 112 relative to customer regions 202. The steps for method 400 apply to each frame of image data 240 received from security cameras 102, 103.

In step 402, the next live video frame is received from security cameras 102, 103. The security video analytics system 132 then analyzes the video frame to identify individuals according to step 404, and generates bounding boxes around the individuals in the video frame according to step 406. The security video analytics system 132 in step 1001 then determines if there are new transaction data from a POS terminal. If new transaction data are not available, the security video analytics system 132 then saves the live analysis results of POS terminal customer proximity inference metadata, and POS terminal 108 transaction data, with video time stamp information with video using the network video recorder 130 according to step 418. However, if new transaction data are available, the security video analytics system 132 then determines whether individuals are within the proximity of a POS terminal 108 (present at the POS terminal 108) in step 408 and transitions to step 1002.

In step 1002, if the security video analytics system 132 finds that an individual is within the proximity of the POS terminal 108, the security video analytics system 132 transitions to step 418. However, if the security video analytics system 132 finds that no individuals are within the proximity of the POS terminal 108, the security video analytics system 132 then generates a suspicious transaction alert according to step 416.

After generating the suspicious transaction alert, the security video analytics system 132 transitions to step 418.

In the aforementioned method steps, once the security video analytics system 132 completes step 418, the security video analytics system 132 returns to step 402 to receive the next live video frame from security cameras 102, 103 to continue its analysis of customer proximity to POS terminals 108 within the frames of video data 240.

In one example, method 400 generates an alert message to indicate when an individual such as a customer 112 is present at a POS terminal 108, regardless of whether there was a POS transaction at that time. This capability could provide data for the number of customers 112 found near a POS terminal 108 over different time periods, useful for marketing and sales purposes.

In another example, while method 400 operates on live video frames captured from security cameras 102, 103, method 400 could also operate on previously recorded video frames from the network video recorder 130.

FIG. 4B illustrates method 420 for forensic processing of previously recorded image data 240 to enable tracking of customers 112 relative to customer regions 202. An operator performing forensic video analysis typically selects a POS transaction to process, determines the time of the POS transaction, and then accesses a subset of the previously recorded video data 240 for the same time as the POS transaction for their analysis sample. The steps for method 420 apply to each frame of video data 240 within the operator's selected analysis sample.

In step 2001, the security video analytics system 132 selects the next POS transaction to process from the transaction data sent by POS terminals 108, 109, and determines the time of the selected POS transaction in step 2002. The security video analytics system 132 then accesses the previously recorded frame of video from network video recorders, and previously computed bounding boxes generated at the time of the POS transaction in step 2003.

The security video analytics system 132 then determines whether individuals are within the proximity of a POS terminal 108 (present at the POS terminal 108) according to step 408.

If the security video analytics system 132 determines in step 414 that a transaction took place without a customer being present, the security video analytics system 132 generates a suspicious transaction alert message in step 416. The security video analytics system 132 then saves the forensic analysis results of the POS terminal customer proximity inference metadata, and POS terminal 108 transaction data, with video time stamp information with the image data using the network video recorder 130 according to step 426.

If the security video analytics system 132 determines in step 414 that a transaction did not took place without a customer being present, the security video analytics system 132 transitions to step 426.

In the aforementioned steps, once the security video analytics system completes step 426, the security video analytics system 132 then iterates to the next POS transaction to process in step 428, which then transitions to step 2001 to select the next POS transaction to process.

While the forensics analysis method 420 typically operates upon previously recorded frames of video data 240, forensic processing of video according to this method can also utilize current image data 240 received from security cameras 102, 103 as in FIG. 4A step 402.

In another example, method 420 generates an alert message to indicate when an individual such as a customer 112 is present at a POS terminal 108, regardless of whether there was a POS transaction at that time. This capability could provide data for the number of customers 112 found near a POS terminal 108 over different time periods, useful for marketing and sales purposes.

Figure 5:
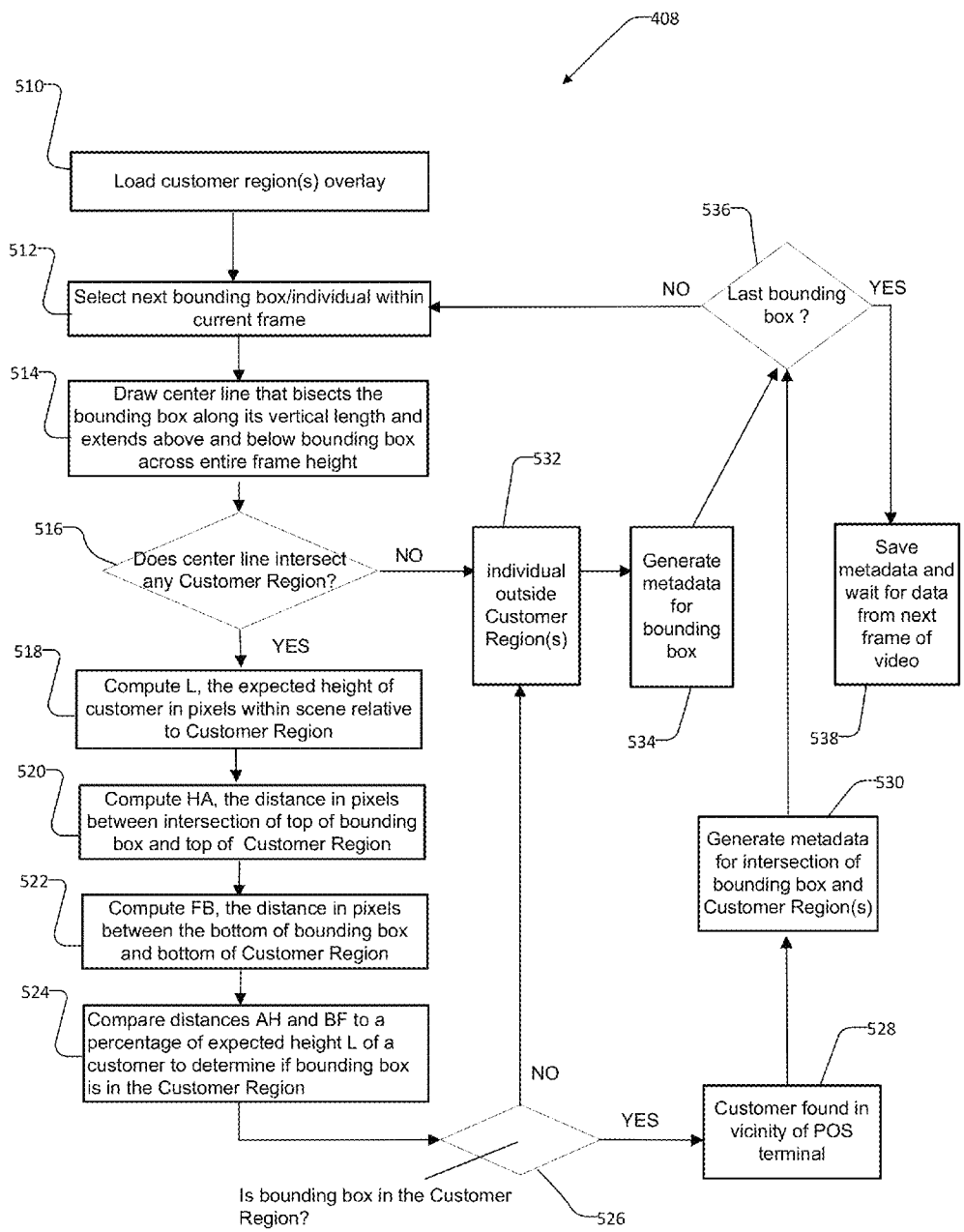
FIG. 5 is a flowchart illustrating a method for determining whether a customer is in the vicinity of a point of sale terminal.

FIG. 5 provides further detail for FIG. 4A, 4B method step 408, illustrating how the security video analytics system 132 determines whether an individual such as a customer 112 is within the proximity of a point of sale terminal 108 within a frame of image data 240 according to principles of the present invention. All detailed steps for method step 408 in FIG. 5 are with respect to the current frame of image data 240 under analysis.

Figure 6A:
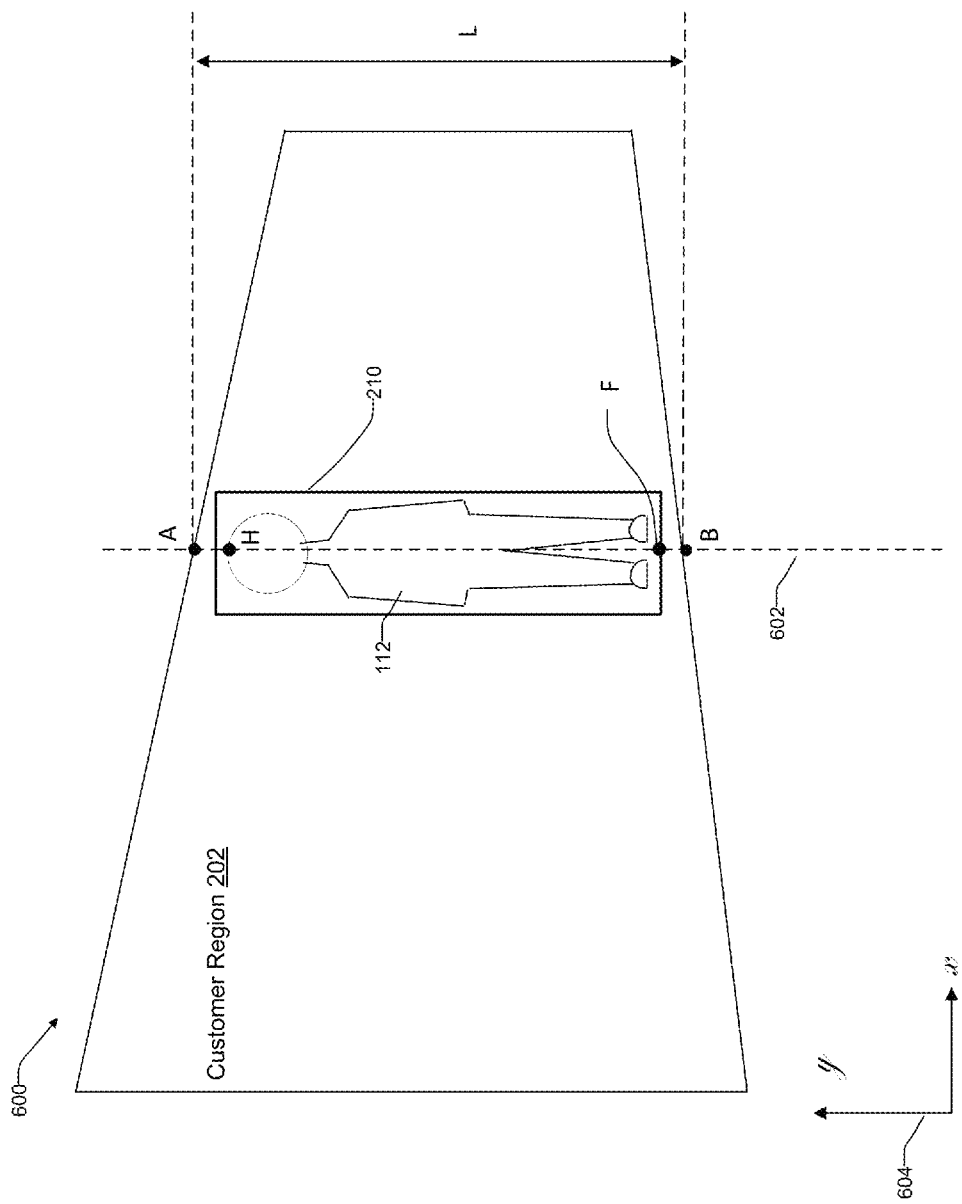
FIGS. 6A-6D are schematic diagrams showing different scenarios of customer bounding boxes relative to customer regions that illustrate the analysis method in FIG. 5.

In step 510, the security video analytics system 132 loads information from the customer region(s) overlay, and selects the next bounding box 210 associated with an individual in step 512. According to step 514, the security video analytics system 132 draws center line 602 (as shown in FIG. 6A) that bisects the bounding box 210 along its vertical length and extends above and below bounding box 210 across its entire frame height. The security video analytics system 132 then makes an initial determination if the center line 602 intersects any customer region(s) 202 according to step 516. If no intersection exists, the security video analytics system 132 in step 532 determines that the individual is outside the customer regions 202. If there is an intersection, step 516 determines that more processing is needed and proceeds to step 518.

According to step 518, the security video analytics system 132 computes L, the expected height of customer in pixels within scene relative to the customer region 202. The security video analytics system 132 then computes HA, the distance in pixels between intersection of top of bounding box 210 and top of customer Region 202 according to step 520, and computes FB, the distance in pixels between the bottom of bounding box and bottom of Customer Region, according to step 522.

According to step 524, the security video analytics system 132 then compares distances AH and BF (as shown in FIG. 6A) to a percentage of expected height L of a customer 112 to determine if the bounding box 210 is in the Customer Region 202. If both distances AH and BF are less than or equal to the percentage of expected height L, meaning that the bounding box 210 was found near the vicinity of the Customer Region 202 according to step 526, then the customer 112 is determined to be in the vicinity of the POS terminal 108 in step 528, and generates metadata for intersection of bounding box and Customer Region(s) 202 according to step 530. If the bounding box 210 was not found near the vicinity of the Customer Region 202 according to step 526, then the customer 112 was located outside the customer region 202 according to step 532.

In preferred embodiments, the range of values for the percentage of expected height L is a percentage greater than zero and less than or equal to fifty percent.

The security video analytics system 132 generates metadata for bounding boxes found outside the customer region 202 according to step 534 after finding that the individual was located outside the customer region 202 according to step 532. After the security video analytics system 132 generates metadata in steps 530 and 534, the security video analytics system 132 checks for more bounding boxes 210 according to step 536. If the security video analytics system 132 determines that this is the last bounding box to process, the security video analytics system 132 then saves metadata and waits for data from the next frame of video according to step 538. If the security video analytics system 132 does find more bounding boxes, the security video analytics system 132 selects the next bounding box 210 associated with the next individual within the current frame according to step 512. The method repeats these steps until the security video analytics system 132 encounters no more bounding boxes 210 to analyze.

FIGS. 6A-6D provide examples showing different scenarios of bounding boxes 210 relative to customer regions 202 that illustrate the analysis method presented in FIG. 5 according to principles of the present invention.

FIG. 6A is an illustrative drawing 600 showing relationships between objects used by the security video analytics system 132 in calculating customer proximity to the POS terminal 108, where the bounding box 210 of a customer 112 lay completely within a customer region 202. Center line 602 intersects the top and bottom of customer region 202 and the tops and bottoms of the customer 112 bounding box 210 are close to top and bottom of the customer region 202 without intersecting. As a result, the customer 112 is highly likely to be located near POS terminal 108 according to detailed method step 408 of FIGS. 4A and 4B. The intersection of center line 602 with the customer region 202 is computed, and distances HA, FB and L are computed. Orientation axes 604 reinforce the fact that the customer region 202 is drawn parallel to the y axis of the image.

Figure 6B:
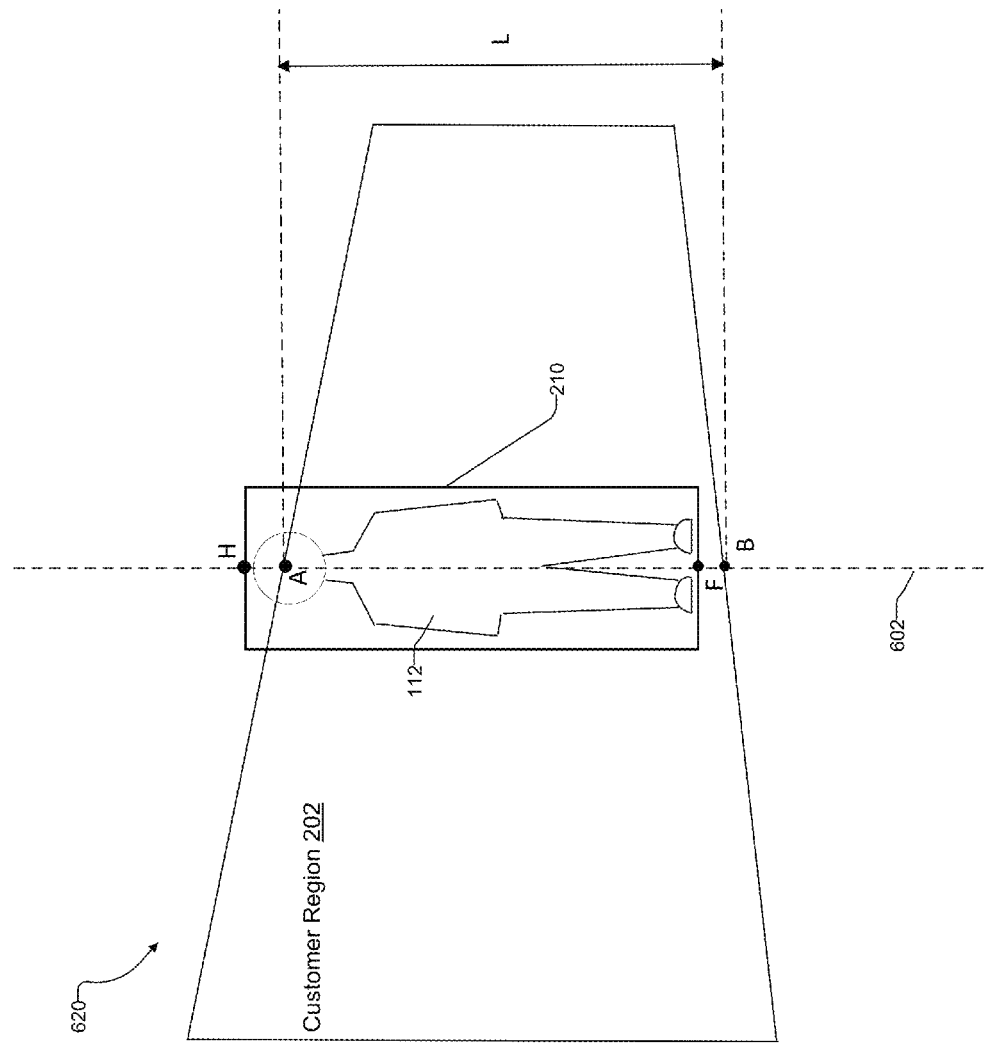

FIG. 6B shows the relationships between objects used by the security video analytics system 132 in calculating customer proximity to the POS terminal 108, where the bounding box 210 of a customer 112 lay almost entirely within a customer region 202, and the top and/or bottom areas of bounding box 210, and center line 602 intersect the top and bottom of the customer region 202. As a result, the customer 112 is highly likely to be located near the POS terminal 108.

Figure 6C:
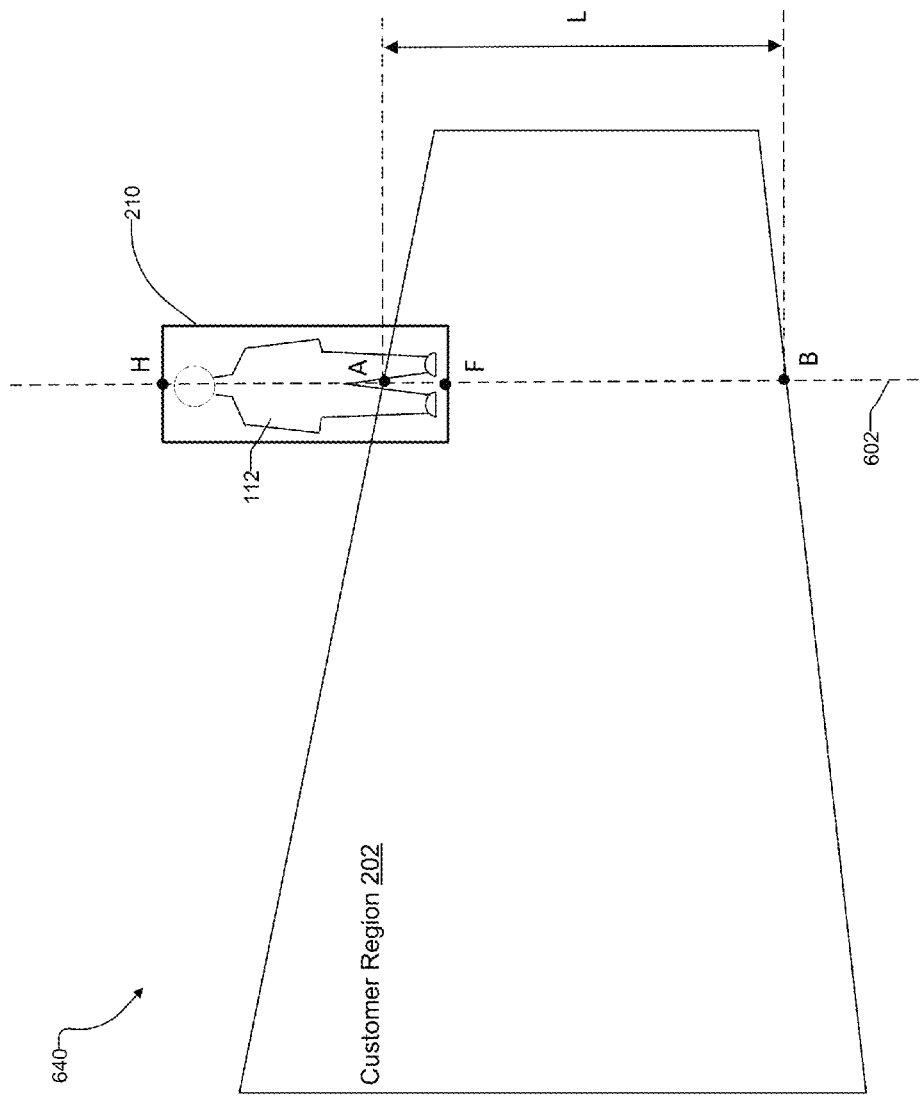

FIG. 6C shows the relationships between objects used by the security video analytics system 132 in calculating customer proximity to the POS terminal 108, where the bounding box 210 of a customer 112 is mostly beyond a customer region 202, therefore indicating that the customer 112 is likely not near the POS terminal 108.

Figure 6D:
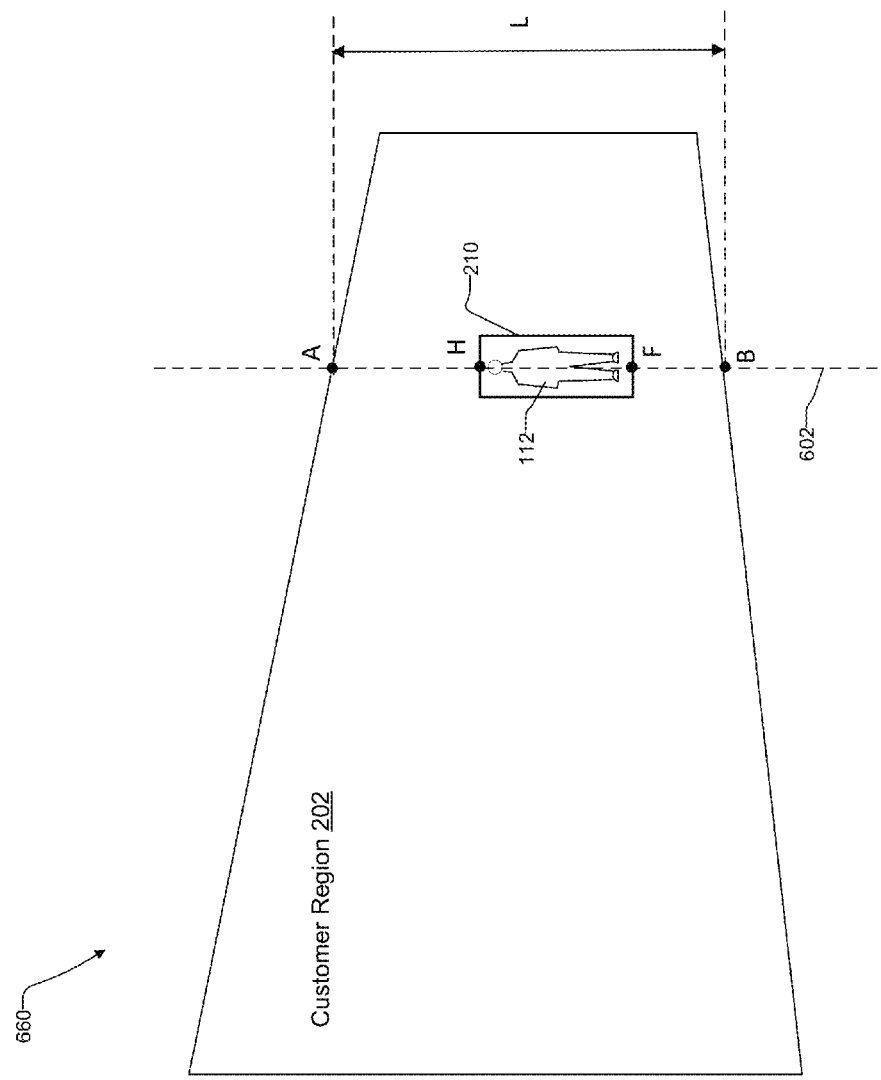

FIG. 6D shows the relationships between objects used by the security video analytics system 132 in calculating customer proximity to the POS terminal 108, where the bounding box 210 of a customer 112 lay completely within a customer region 202 as in FIG. 6A. Like in FIG. 6A, the tops and bottoms of bounding box 210 in FIG. 6D do not intersect the top and bottom of the customer region 202. Unlike in FIG. 6A, however, the distance HA between the top of the bounding box and the top of the customer region 202, and the distance FB between the bottom of the bounding box and the bottom of the customer region 202, are much greater than distances HA and FB in FIG. 6A. As a result, customer 112 is likely not located near POS terminal 108 according to FIGS. 4A and 4B method step 408.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security video system for monitoring individuals at a Point Of Sale ("POS") area, the security video system comprising:
    at least one security camera generating image data of the POS area, wherein the security camera is positioned outside the POS area; and
    a security video analytics system for analyzing the image data to determine whether the individuals are within the POS area by reference to one or more customer regions, which are areas overlaid on the image data, the individuals being analyzed relative to the customer regions, wherein the customer re ions are trapezoidal-shaped, and the customer regions correspond to vertically oriented planes in a three-dimensional space of scenes captured in the image data; and
    wherein the security video analytics system determines whether the individuals are within the POS area based on lowest visible areas of their bodies relative to bottom edges of the customer regions and based on highest visible areas of their bodies relative to top edges of the customer regions.

2. The security video system of claim 1, further comprising a security system workstation enabling specification of the customer regions for the image data of the POS area.

3. The security video system of claim 2, wherein the security system workstation comprises:
    a display;
    one or more user input devices; and
    a customer region drawing tool for defining the customer regions within the image data of the POS area, drawn by an operator over the image data.

4. The security video system of claim 1, wherein the customer regions are areas of pixels with vertical edges parallel to the y-axis of the image data.

5. The security video system of claim 1, wherein the field of view of the security camera captures at least a POS terminal of the POS area and the customer regions.

6. The security video system of claim 1, wherein the security video analytics system generates bounding boxes around individuals in the image data and compares the bounding boxes relative to the customer regions to infer proximity of the individuals to the POS area.

7. The security video system of claim 6, wherein the security video analytics system compares the bounding boxes relative to the customer regions to infer proximity of the individuals to the PUS area.

8. The security video system of claim 6, wherein the security video analytics system analyzes the bounding boxes relative to the customer regions and determines distances between the tops and/or bottoms of the bounding boxes and tops and bottoms of the customer regions to conclude whether the individuals are within the POS area.

9. The security video system of claim 1, wherein the security video system performs forensic analysis on stored image data to determine proximity of the individuals to the PUS area.

10. The security video system of claim 1, wherein the security video system performs live analysis on current image data to determine proximity of the individuals to the PUS area.

11. The security video system of claim 1, wherein the security video analytics system computes L, the expected height of the individuals in pixels relative to the customer regions, and then computes HA, the distance in pixels between intersection of the highest visible areas of their bodies relative to the top edges of the customer regions, and computes FB, the distance in pixels between the lowest visible areas of their bodies relative to bottom edges of the customer regions and the bottom of bounding box and bottom of Customer Regions.

12. The security video system of claim 11, wherein the security video analytics system compares the distances AH and BF to a percentage of expected height L of the individuals to determine if the individuals are in a vicinity of the POS area.

13. A method for monitoring individuals at a Point Of Sale ("PUS") area, the method comprising:
    positioning a security camera outside the PUS area;

generating image data of the PUS area with the security camera; and analyzing the image data to determine whether the individuals are within the POS area by reference to one or more customer regions, which are areas overlaid on the image data, by analyzing the individuals relative to the customer regions, the customer regions being trapezoidal-shape areas of pixels corresponding to vertically oriented planes in a three-dimensional space of scenes captured in the image data, the determination of whether the individuals are within the POS area being based on lowest visible areas of their bodies relative to bottom edges of the customer regions and based on highest visible areas of their bodies relative to top edges of the customer regions.

14. The method of claim 13, further comprising enabling specification of the customer regions for the image data of the POS area by enabling an operator to draw the customer regions on the image data of the POS area.

15. The method of claim 13, further comprising representing the customer regions as areas of pixels with vertical edges parallel to the y-axis of the image data, and saving the areas of pixels comprising each of the customer regions to video data metadata.

16. The method of claim 13, further comprising capturing at least a POS terminal of the POS area and the customer regions within the image data.

17. The method of claim 13, further comprising generating bounding boxes around the individuals in the image data and comparing the bounding boxes relative to the customer regions to infer proximity of the individuals to the POS area.

18. The method of claim 17, further comprising analyzing the bounding boxes relative to the customer regions and determining distances between the tops and/or bottoms of the bounding boxes and tops and bottoms of the customer regions to conclude whether the individuals are within the POS area.

19. The method of claim 18, wherein analyzing the bounding boxes relative to the customer regions includes drawing a center line bisecting each bounding box and determining intersection between one or more edges of the customer regions.

20. The method of claim 13, further comprising performing forensic analysis on stored image data to determine proximity of the individuals to the POS area.

21. The method of claim 13, further comprising performing live analysis on current image data to determine proximity of the individuals to the POS area.

22. A method for determining the presence of individuals at a Point Of Sale ("POS") area in a video security system, comprising:

generating image data of the POS area from at least one security camera;

generating bounding boxes around individuals in the image data by a security video analytics system;

representing customer regions as areas of pixels overlaid on the image data, the customer re ions being trapezoidal-shaped, and the customer regions corresponding to vertically oriented planes in a three-dimensional space of scenes captured in the image data; and analyzing the bounding boxes relative to the customer regions to infer whether the individuals are within the POS area based on distances between the tops and bottoms of the bounding boxes and tops and bottoms, respectively, of the customer regions.

23. The method of claim 22, wherein analyzing the bounding boxes relative to the customer regions includes drawing a center line bisecting each bounding box and determining intersection between one or more customer regions.

24. A security video system for monitoring individuals at a Point Of Sale ("POS") area, the security video system comprising:

at least one security camera generating image data of the POS area; and a security video analytics system for analyzing the image data to determine whether the individuals are within the POS area by generating bounding boxes around individuals in the image data, and comparing the bounding boxes relative to customer regions, which are areas overlaid on the image data, to infer proximity of the individuals to the POS area;

wherein the customer regions are trapezoidal-shaped, and the customer re ions correspond to vertically oriented planes in a three-dimensional space of scenes captured in the image data; and wherein the security video analytics system determines whether the individuals are within the POS area based on distances between the tops and bottoms of the bounding boxes and tops and bottoms, respectively, of the customer regions.

* * * * *